United States Patent
Gu et al.

(10) Patent No.: US 9,407,915 B2
(45) Date of Patent: *Aug. 2, 2016

(54) LOSSLESS VIDEO CODING WITH SUB-FRAME LEVEL OPTIMAL QUANTIZATION VALUES

(71) Applicant: Google Inc., Mountain View, CA (US)

(72) Inventors: Qunshan Gu, Hayward, CA (US); Xun Cai, Cambridge, MA (US)

(73) Assignee: GOOGLE INC., Mountain View, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 13/741,927

(22) Filed: Jan. 15, 2013

(65) Prior Publication Data

US 2014/0098856 A1    Apr. 10, 2014

Related U.S. Application Data (63) Continuation-in-part of application No. 13/647,089, filed on Oct. 8, 2012, and a continuation-in-part of application No. 13/647,092, filed on Oct. 8, 2012.

(51) Int. Cl.
*H04N 19/124* (2014.01)
*H04N 19/12* (2014.01)
*H04N 19/139* (2014.01)
*H04N 19/159* (2014.01)
*H04N 19/61* (2014.01)
(Continued)

(52) U.S. Cl.
CPC .............. *H04N 19/12* (2014.11); *H04N 19/124* (2014.11); *H04N 19/139* (2014.11); *H04N 19/159* (2014.11); *H04N 19/36* (2014.11); *H04N 19/593* (2014.11); *H04N 19/61* (2014.11); *H04N 19/107* (2014.11)

(58) Field of Classification Search
None
See application file for complete search history.

(56) References Cited

U.S. PATENT DOCUMENTS

| | | |
|---|---|---|
| 5,148,269 A | 9/1992 | de Haan et al. |
| 5,150,209 A | 9/1992 | Baker et al. |

(Continued)

FOREIGN PATENT DOCUMENTS

| | | |
|---|---|---|
| EP | 0634873 | 1/1995 |
| EP | 1496706 | 1/2005 |

(Continued)

OTHER PUBLICATIONS

Chen, Michael C., et al.; "Design and Optimization of a Differentially Coded Variable Block Size Motion Compensation System", IEEE 1996, 4 pp.

(Continued)

*Primary Examiner* — Dave Czekaj
*Assistant Examiner* — Tyler W Sullivan
(74) *Attorney, Agent, or Firm* — Young Basile Hanlon & MacFarlane, P.C.

(57) ABSTRACT

A block of a frame of a video stream can be encoded using lossless coding that generates a transform domain residual block and a spatial domain difference block. The compression ratio of the coding may be improved by selecting an optimal quantization value on a per-block basis. The optimal quantization value can be selected by quantizing a residual block resulting from prediction of the block using a plurality of candidate quantization values and selecting the candidate quantization value that results in the fewest number of bits for the quantized residual block.

18 Claims, 7 Drawing Sheets

(51) Int. Cl.
*H04N 19/593* (2014.01)
*H04N 19/36* (2014.01)
*H04N 19/107* (2014.01)

(56) References Cited

U.S. PATENT DOCUMENTS

| | | | |
|---|---|---|---|
| 5,337,086 A | 8/1994 | Fujinami | |
| 5,398,068 A | 3/1995 | Liu et al. | |
| 5,512,952 A | 4/1996 | Iwamura | |
| 5,590,329 A | 12/1996 | Goodnow, II et al. | |
| 5,644,709 A | 7/1997 | Austin | |
| 5,708,473 A | 1/1998 | Mead | |
| 5,731,840 A | 3/1998 | Kikuchi et al. | |
| 5,754,742 A | 5/1998 | Astle | |
| 5,861,921 A * | 1/1999 | Shimizu | H04N 19/176 375/240.04 |
| 5,886,742 A | 3/1999 | Hibi et al. | |
| 5,946,486 A | 8/1999 | Pekowski | |
| 5,991,447 A | 11/1999 | Eifrig et al. | |
| 6,005,980 A | 12/1999 | Eifrig et al. | |
| 6,028,967 A | 2/2000 | Kim et al. | |
| 6,085,029 A | 7/2000 | Kolawa et al. | |
| 6,243,416 B1 | 6/2001 | Matsushiro et al. | |
| 6,263,114 B1 | 7/2001 | Saunders | |
| 6,272,179 B1 | 8/2001 | Kadono | |
| 6,289,049 B1 | 9/2001 | Kim et al. | |
| 6,314,208 B1 | 11/2001 | Konstantinides et al. | |
| 6,359,929 B1 | 3/2002 | Boon | |
| 6,363,119 B1 | 3/2002 | Oami | |
| 6,381,277 B1 | 4/2002 | Chun et al. | |
| 6,434,197 B1 | 8/2002 | Wang et al. | |
| 6,473,460 B1 | 10/2002 | Topper | |
| 6,532,306 B1 | 3/2003 | Boon et al. | |
| 6,542,990 B1 | 4/2003 | Tremblay et al. | |
| 6,650,704 B1 | 11/2003 | Carlson et al. | |
| 6,654,419 B1 | 11/2003 | Sriram et al. | |
| 6,681,299 B1 | 1/2004 | Shimamura et al. | |
| 6,687,304 B1 | 2/2004 | Peng | |
| 6,700,809 B1 | 3/2004 | Ng et al. | |
| 6,711,211 B1 | 3/2004 | Lainema | |
| 6,735,249 B1 | 5/2004 | Karczewicz et al. | |
| 6,907,079 B2 | 6/2005 | Gomila et al. | |
| 7,114,104 B1 | 9/2006 | Bennett | |
| 7,158,681 B2 | 1/2007 | Persiantsev | |
| 7,185,125 B2 | 2/2007 | Rougnon-Glasson | |
| 7,216,135 B2 | 5/2007 | Sawdon et al. | |
| 7,218,674 B2 | 5/2007 | Kuo | |
| 7,236,527 B2 | 6/2007 | Ohira | |
| 7,263,125 B2 | 8/2007 | Lainema | |
| 7,277,587 B2 | 10/2007 | Sun | |
| 7,333,544 B2 | 2/2008 | Kim et al. | |
| 7,450,642 B2 | 11/2008 | Youn | |
| 7,457,362 B2 | 11/2008 | Sankaran | |
| 7,487,314 B1 | 2/2009 | Agesen et al. | |
| 7,602,851 B2 | 10/2009 | Lee et al. | |
| 7,602,997 B2 | 10/2009 | Young | |
| 7,681,077 B1 | 3/2010 | Eitzmann et al. | |
| 7,689,051 B2 | 3/2010 | Mukerjee | |
| 7,734,893 B2 | 6/2010 | Hattori et al. | |
| 7,768,515 B1 | 8/2010 | Eitzmann et al. | |
| 7,836,434 B1 | 11/2010 | Boucher | |
| 7,856,538 B2 | 12/2010 | Speirs, II et al. | |
| 7,983,338 B2 | 7/2011 | Takamura et al. | |
| 8,311,111 B2 | 11/2012 | Xu et al. | |
| 8,325,796 B2 | 12/2012 | Wilkins et al. | |
| 8,526,498 B2 | 9/2013 | Lim et al. | |
| 8,666,181 B2 | 3/2014 | Venkatapuram et al. | |
| 8,711,935 B2 | 4/2014 | Kim et al. | |
| 8,724,702 B1 | 5/2014 | Bulusu et al. | |
| 8,761,242 B2 | 6/2014 | Jeon et al. | |
| 9,210,432 B2 * | 12/2015 | Gu | H04N 19/139 |
| 2002/0031272 A1 | 3/2002 | Bagni et al. | |
| 2003/0053541 A1 | 3/2003 | Sun et al. | |
| 2003/0072364 A1 | 4/2003 | Kim et al. | |
| 2003/0140238 A1 | 7/2003 | Turkboylari | |
| 2003/0202705 A1 | 10/2003 | Sun | |
| 2004/0114568 A1 | 6/2004 | Beverly | |
| 2005/0265444 A1 | 12/2005 | Kim | |
| 2005/0265447 A1 | 12/2005 | Park | |
| 2005/0283770 A1 | 12/2005 | Karp et al. | |
| 2006/0277371 A1 | 12/2006 | Cohn et al. | |
| 2007/0019729 A1 | 1/2007 | Nakagomi et al. | |
| 2007/0065026 A1 | 3/2007 | Lee et al. | |
| 2007/0110327 A1 * | 5/2007 | Han | H04N 19/115 382/251 |
| 2007/0156986 A1 | 7/2007 | Neiger et al. | |
| 2007/0268964 A1 | 11/2007 | Zhao | |
| 2008/0013844 A1 | 1/2008 | Hu | |
| 2008/0123747 A1 | 5/2008 | Lee et al. | |
| 2008/0152008 A1 * | 6/2008 | Sun | H04N 19/70 375/240.16 |
| 2008/0181299 A1 * | 7/2008 | Tian | H04N 19/13 375/240.03 |
| 2008/0192821 A1 * | 8/2008 | Malayath | H04N 19/154 375/240.03 |
| 2008/0211901 A1 | 9/2008 | Civanlar et al. | |
| 2008/0225947 A1 | 9/2008 | Narroschke et al. | |
| 2008/0240250 A1 | 10/2008 | Lin et al. | |
| 2009/0043978 A1 | 2/2009 | Sawdon et al. | |
| 2009/0190660 A1 | 7/2009 | Kusakabe et al. | |
| 2009/0284651 A1 * | 11/2009 | Srinivasan | H04N 19/50 348/425.1 |
| 2010/0086028 A1 | 4/2010 | Tanizawa et al. | |
| 2010/0104021 A1 | 4/2010 | Schmit | |
| 2010/0118945 A1 | 5/2010 | Wada et al. | |
| 2010/0128796 A1 | 5/2010 | Choudhury | |
| 2010/0166061 A1 | 7/2010 | Kondo et al. | |
| 2010/0177819 A1 | 7/2010 | Jeon et al. | |
| 2010/0194910 A1 | 8/2010 | Matsuo et al. | |
| 2010/0226436 A1 | 9/2010 | Dane et al. | |
| 2010/0260268 A1 | 10/2010 | Cowan et al. | |
| 2010/0322306 A1 | 12/2010 | Au et al. | |
| 2011/0026591 A1 | 2/2011 | Bauza et al. | |
| 2011/0038410 A1 | 2/2011 | Narroschke et al. | |
| 2011/0052087 A1 * | 3/2011 | Mukherjee | H04N 19/46 382/248 |
| 2011/0173505 A1 | 7/2011 | Bae et al. | |
| 2011/0235706 A1 | 9/2011 | Demircin et al. | |
| 2011/0243229 A1 | 10/2011 | Kim et al. | |
| 2011/0293001 A1 | 12/2011 | Lim et al. | |
| 2011/0304634 A1 | 12/2011 | Urbach | |
| 2012/0170647 A1 | 7/2012 | He et al. | |
| 2012/0278665 A1 | 11/2012 | Serebryany et al. | |
| 2012/0307890 A1 * | 12/2012 | Lu | H04N 19/176 375/240.03 |
| 2012/0307906 A1 * | 12/2012 | Kim | H04N 19/176 375/240.16 |
| 2012/0314760 A1 | 12/2012 | He | |
| 2013/0077671 A1 | 3/2013 | Tanaka | |
| 2013/0077696 A1 | 3/2013 | Zhou | |
| 2014/0098854 A1 * | 4/2014 | Gu | H04N 19/593 375/240.03 |
| 2014/0098855 A1 * | 4/2014 | Gu | H04N 19/139 375/240.03 |
| 2014/0226715 A1 | 8/2014 | Sato | |
| 2015/0110408 A1 * | 4/2015 | Wang | G06T 9/004 382/238 |

FOREIGN PATENT DOCUMENTS

| | | |
|---|---|---|
| EP | 1605403 | 12/2005 |
| EP | 1903698 | 3/2008 |
| EP | 2048887 | 4/2009 |
| WO | WO03021969 | 3/2003 |
| WO | WO 2011065735 A2 * | 6/2011 |

OTHER PUBLICATIONS

Chen, Xing C., et al.; "Quadtree Based Adaptive Lossy Coding of Motion Vectors", IEEE 1996, 4 pp.

Ebrahimi, Touradj, et al.; "Joint motion estimation and segmentation for very low bitrate video coding", SPIE vol. 2501, 1995, 12 pp.

Guillotel, Philippe, et al.; "Comparison of motion vector coding techniques", SPIE vol. 2308, 1994, 11 pp.

(56) References Cited

OTHER PUBLICATIONS

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Zhao, Qin, et al.; "Efficient Memory Shadowing for 64-bit Architectures", Procedings of the 2010 International Symposium of Memory Management, Jun. 5, 2010, pp. 93-102.
Arbeiter, J. H. et al.; "A Two-Dimensional Real-Time Video Pyramid Processor", RCA Review, RCA Corp. Princeton, US, vol. 47, No. 1, Mar. 1, 1986, pp. 3-31.
Cassidy, An analysis of VP8, a new video codec for the web, 148 pages. Nov. 2011.
Chee, Y-K.; "Survey of Progressive Image Transmission Methods", International Journal of Imaging Systems and Technology, Wiley and Sons, New York, US, vol. 10, No. 1, Jan. 1, 1999, pp. 3-19.

Pai, et al., MPEG 4 constant quality constant bit rate control algorithms, signal processing:image communication, Jan. 2005, vol. 21, Issue 1, pp. 67-89.
Park, Jun Sung, et al., "Selective Intra Prediction Mode Decision for H.264/AVC Encoders", World Academy of Science, Engineering and Technology 13, (2006).
Price, Thomas B.; "Muscle and Liver Carbohydrates: Response to Military Task Performance by Women and Men", Oct. 1, 1997, http://www.dtic.mil/docs/citations/ADA337501, p. 10.
Schrieber W.F.; "Advanced Television Systems for Terrestrial Broadcasting: Some Problems and Some Proposed Solutions", Proceedings of the IEEE, IEEE New York, US, vol. 83, No. 6, Jun. 1, 1995, pp. 958-981.
Shimono et al.; "Transform Image Coding With Edge Compensation", Electronics and Communications in Japan, Part I: Communications, Hoboken, NJ, US, vol. 74, No. 10, Oct. 1, 1991, pp. 49-56.
Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.
Patent Cooperation Treaty Invitation to Pay Fees, International Searching Authority International Application No. PCT/US2013/063722 mailed on Dec. 9, 2013.
Schwarz H. et al.: "SNR-scalable extension of H.264/AVC" , Image Processing, 2004. ICIP 2004 International Conference on Singapore Oct. 24-27, 2004.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services- Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.

(56) References Cited

OTHER PUBLICATIONS

Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Schwarz et al., "Overview of SVC" IEEE Trans Cir Sys for Vid Tech, Sep. 2007.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.

* cited by examiner

LOSSLESS VIDEO CODING WITH SUB-FRAME LEVEL OPTIMAL QUANTIZATION VALUES

CROSS-REFERENCE TO RELATED APPLICATIONS

This application is a continuation-in-part of U.S. application Ser. No. 13/647,089, filed Oct. 8, 2012, and is a continuation-in-part of U.S. application Ser. No. 13/647,092, filed Oct. 8, 2012, each of which is incorporated herein in its entirety by reference.

TECHNICAL FIELD

This disclosure relates to encoding and decoding visual data, such as video stream data, for transmission or storage using lossless encoding.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Compression techniques can result in lossy or lossless compression. Lossy compression generates video bitstreams that, when decoded, are acceptable for most video viewing. However, some applications, such as video editing, screen sharing or medical imaging, for example, may more desirably use lossless compression.

SUMMARY

Disclosed herein are aspects of systems, methods and apparatuses for encoding a video stream including a plurality of frames. One method includes, by example, selecting a block of a plurality of blocks of a frame, identifying an optimal quantization value for the block that minimizes a number of bits included in an encoded residual block of the block and an encoded difference block of the block, encoding the block using the optimal quantization value to form the encoded residual block and the encoded difference block, and including the encoded residual block, the encoded difference block and the optimal quantization value in an encoded video bitstream.

The teachings herein also describe an apparatus for encoding a video stream including a plurality of frames. The apparatus includes a memory and a processor. The processor is configured to execute instructions stored in the memory to select a block of a plurality of blocks of a frame, identify an optimal quantization value for the block that minimizes a number of bits included in an encoded residual block of the block and an encoded difference block of the block, encode the block using the optimal quantization value to form the encoded residual block and the encoded difference block, and include the encoded residual block, the encoded difference block and the optimal quantization value in an encoded video bitstream.

Another method described herein is a method for decoding an encoded video bitstream including a plurality of frames. The method includes identifying an entropy coded quantized block and an entropy coded difference block associated with a block of a frame by reading bits in a block header associated with the block, identifying an optimal quantization value for the quantized block by reading bits in a block header associated with the block, wherein the optimal quantization value is a value that minimizes a number of bits included in the entropy coded quantized block and the entropy coded difference block, entropy decoding the entropy coded quantized block to form a quantized block, entropy decoding the entropy coded difference block to form a difference block, de-quantizing the quantized block using the optimal quantization value to form a transformed block, inverse transforming the transformed block to form a first residual block, adding the difference block to the first residual block to form a second residual block, predicting the block to form a prediction block, and adding the second residual block to the predicted block to form a decoded block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Lossy encoding of digital video data, whether static images or streaming data, can achieve high compression ratios by employing transformations and quantization techniques that are not 100% reversible, in the sense that encoding and decoding image data using these techniques can result in output video data that does not match the input video data. In contrast, lossless encoding can result in output video data substantially identical to the input video data. Lossless encoding has limitations on compression ratio. Compression ratio is defined as the ratio of the number of bits used to represent unencoded video data to the number of bits used to represent the same video data when encoded.

The teachings herein can improve compression ratios for lossless encoding of video data encoded using either inter or intra prediction as described hereinafter. Inter prediction encoding generally creates a prediction block using pixel data from temporally nearby frames. Intra prediction creates a prediction block using pixel data from blocks peripheral to the current block in the same frame. The prediction block can be subtracted from the current block to create a residual block, also called a residual, which represents the difference between the prediction block and the block currently being encoded. After generation of the residual block, the residual block is transformed according to the teachings herein and then, following determination of an optimal quantization value, the transformed residual block is quantized. Generally, the resulting quantized, transformed residual block is entropy coded, which is a form of lossless encoding, for transmission or storage within an encoded video bitstream.

The process of transforming and quantizing the residual block can result in information loss with respect to the original residual block. De-quantizing and inverse transforming the residual block during decoding thus results in a lossy version of the residual block that differs from the original residual due to the errors introduced by the lossy encoding. According to the teachings herein, the lossy version of the residual can be subtracted from the original residual to yield a difference residual that represents the losses due to lossy encoding. This difference residual can then be losslessly encoded and included in the encoded video bitstream along with the lossy encoded residual block. The encoded residual and difference blocks can be combined at the decoder to recreate the original residual block to thereby achieve lossless encoding.

According to the teachings herein, an optimal quantization value is selected for the residual block that balances the data between the original residual block and the difference block. Selecting the optimal quantization value on a per-block basis can reduce the number of bits required to represent the losslessly-encoded block, thereby increasing the compression ratio of the encoded video data.

First discussed below are environments in which aspects of this disclosure can be implemented, and then details of certain implementations are explained.

Figure 1:
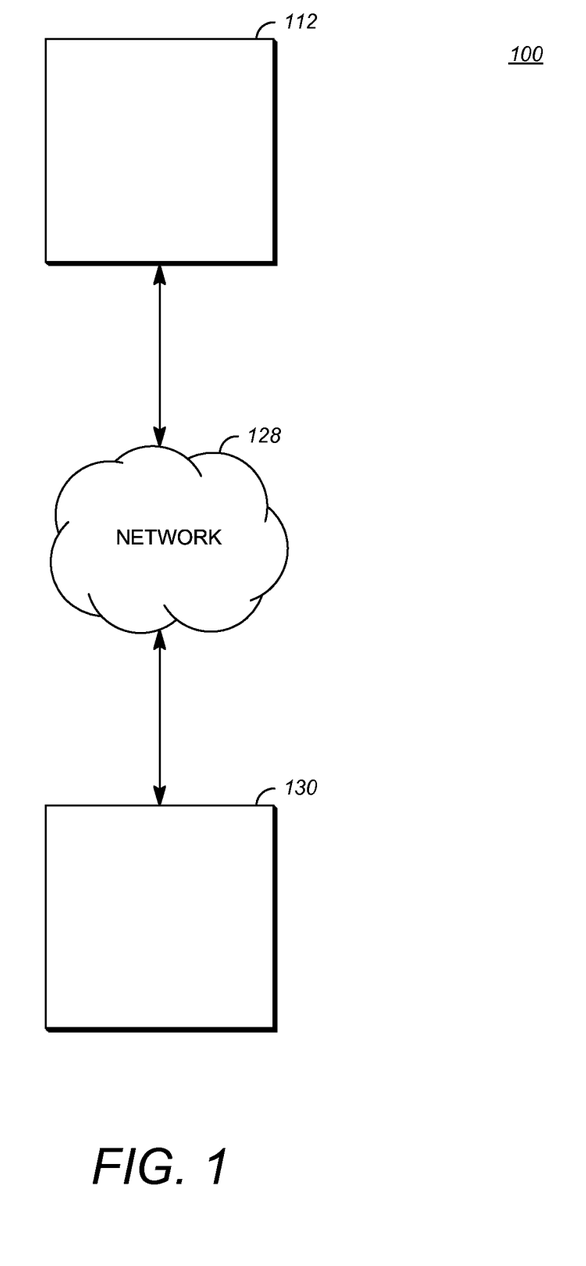
FIG. 1 is a schematic diagram of a video encoding and decoding system.

FIG. 1 is a schematic diagram of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
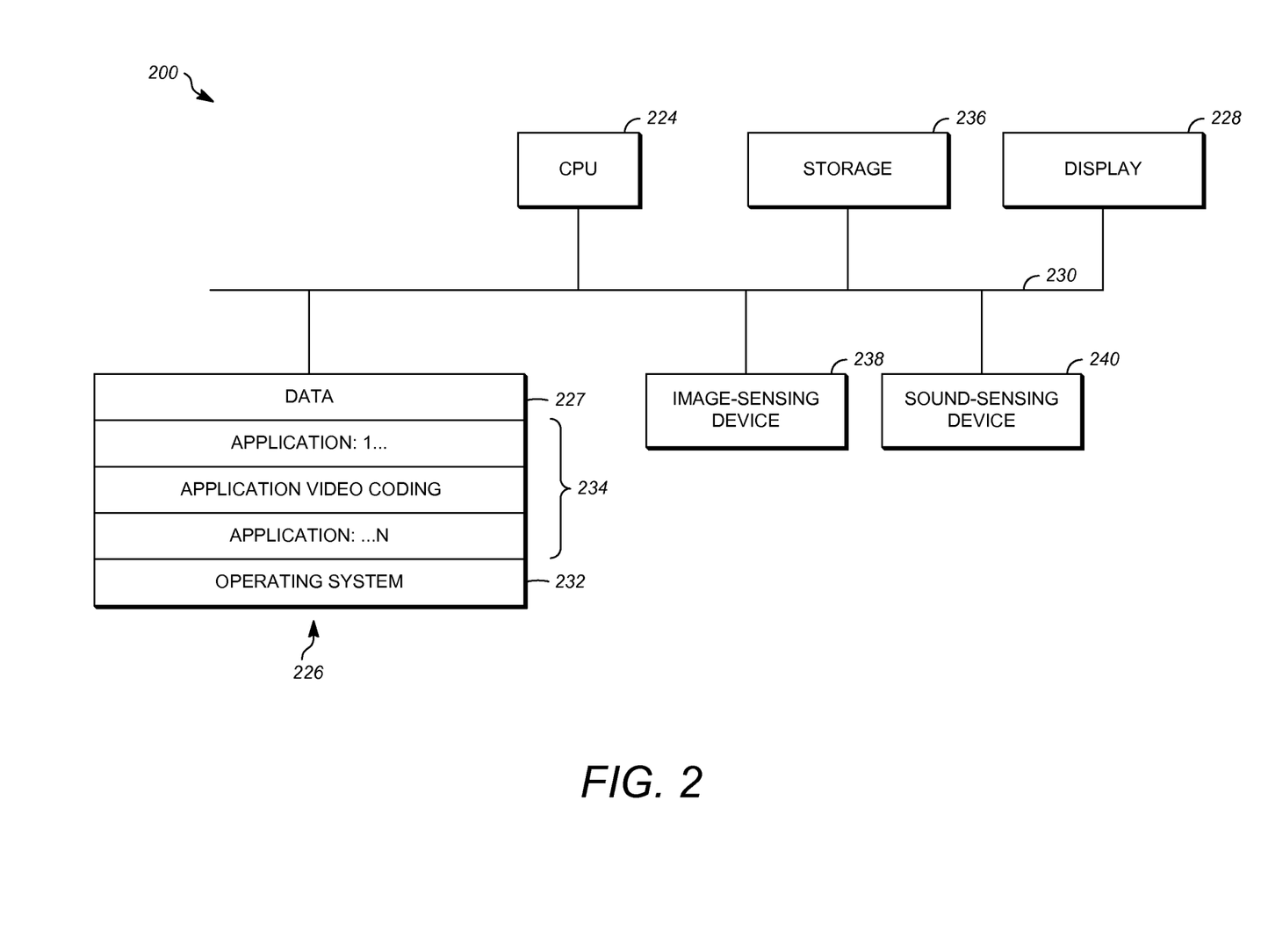
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
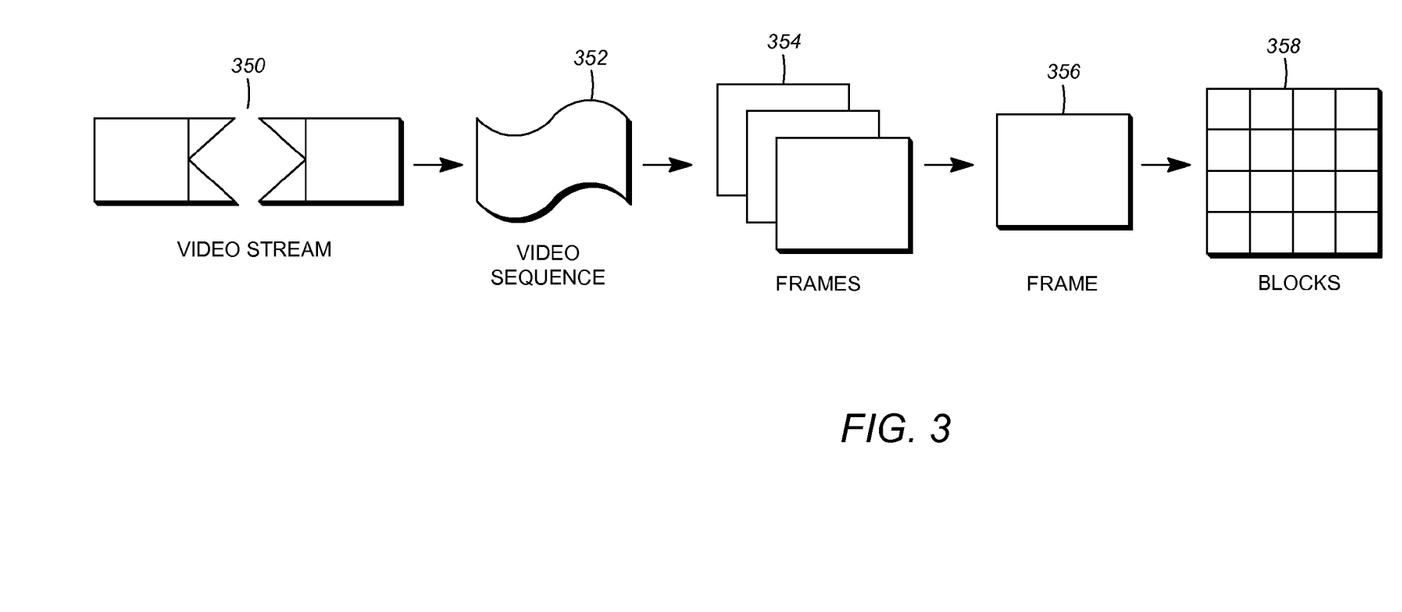
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, single frame 356 can be divided into a series of blocks 358, which can contain data corresponding to, for example, 16×16 pixels in frame 356. Blocks 358 can also be arranged in planes of data. For example, a corresponding block in each plane can respectively contain luminance and chrominance data for the pixels of the block. Blocks 358 can also be of any other suitable size such as 32×32, 8×8 or 4×4 pixel groups and can be further subdivided into smaller blocks depending on the application. Unless otherwise noted, the terms block and macroblock are used interchangeably herein.

Figure 4:
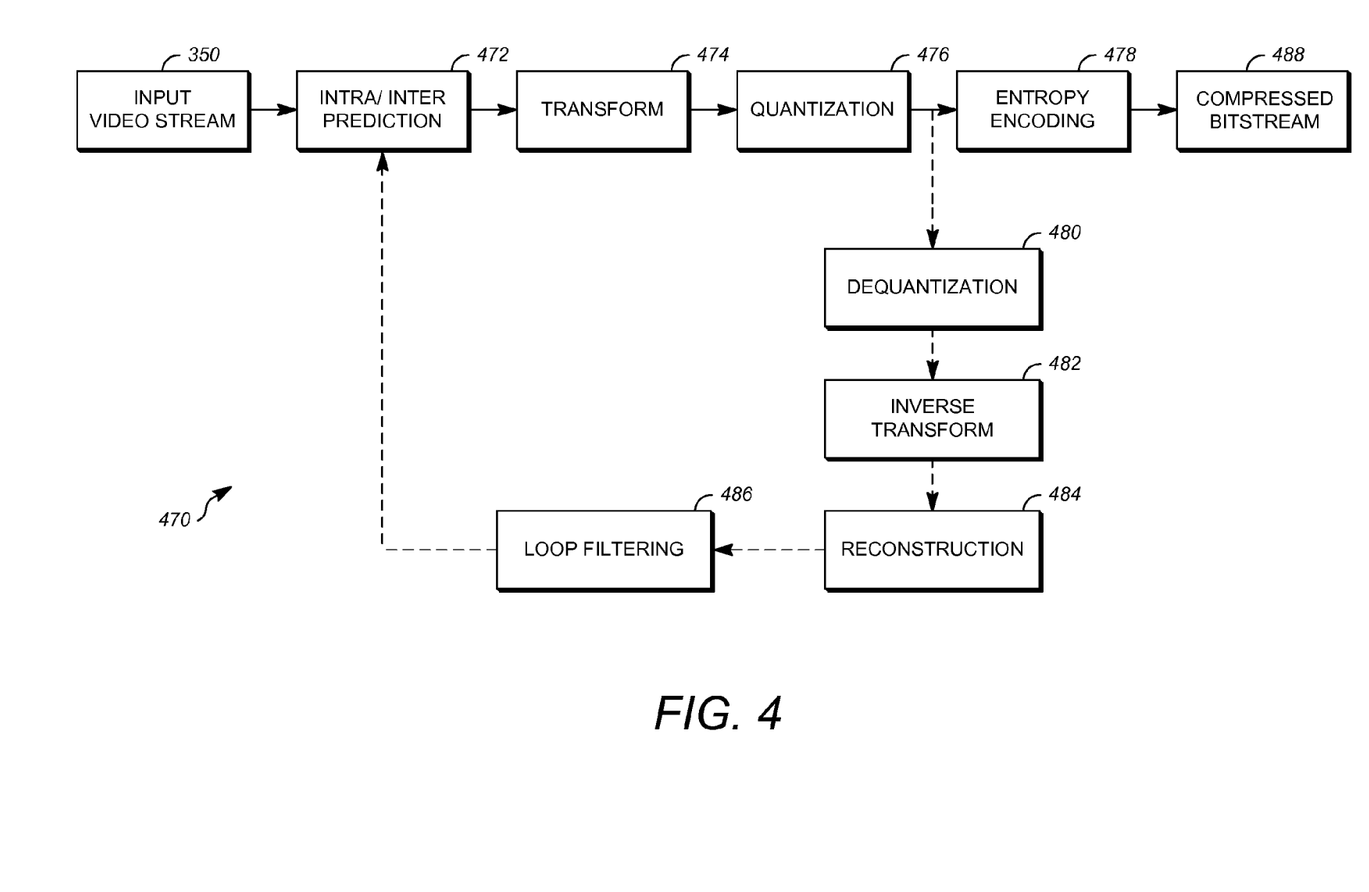
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 within the video stream 350 can be processed in units of blocks. At the intra/inter prediction stage 472, each block can be encoded using intra-frame prediction (also called intra prediction) or inter-frame prediction (also called inter prediction). In either case, a prediction block can be formed. In the case of intra prediction, a prediction block may be formed from samples in the current frame that have been previously encoded and reconstructed. In the case of inter prediction, a prediction block may be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT) and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including de-quantizing the quantized transform coefficients at dequantization stage 480 and inverse transforming the de-quantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
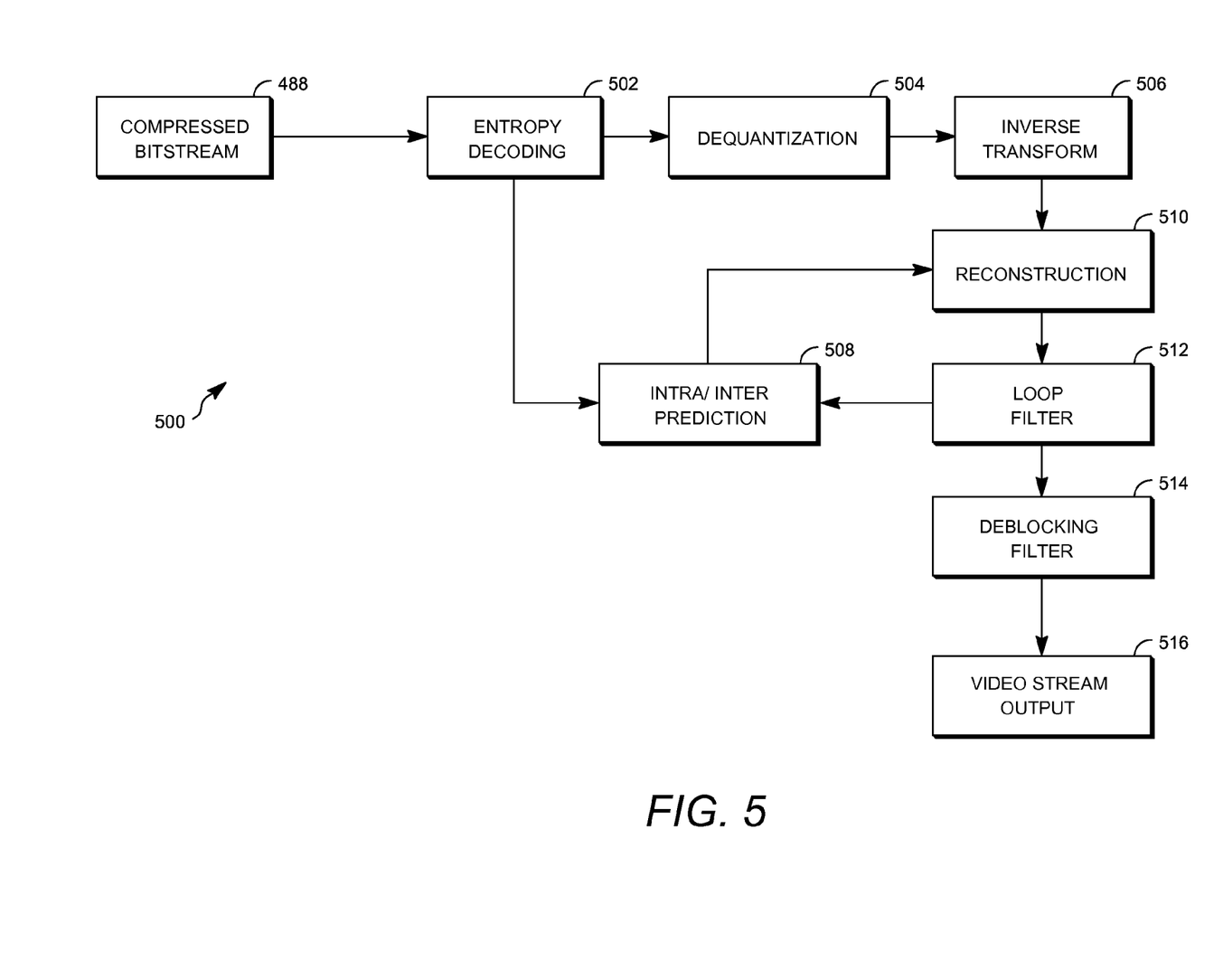
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a de-blocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 de-quantizes the quantized transform coefficients, and inverse transform stage 506 inverse transforms the de-quantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, de-blocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without de-blocking filtering stage 514.

The teachings herein may be implemented in the structures described above, As mentioned briefly, lossless compression is desirably improved by inter or intra predicting blocks of a frame. After prediction, the residual error signals of the predicted block are transformed, quantized and entropy coded in a first stage transform domain coding process. Most of the energy can be coded in the residual error signals by dynamically changing the quantization levels used to transform the blocks. After the transform domain quantization and entropy coding, the residual error signals are reconstructed by way of dequantization and inverse transformation. The reconstructed residual error signals, which are not identical to the original residual error signals, are then be subtracted from the original residual error signals to form a second layer residual error signal. This second layer residual error signal is then entropy coded in a second stage spatial domain coding process.

Figure 6:
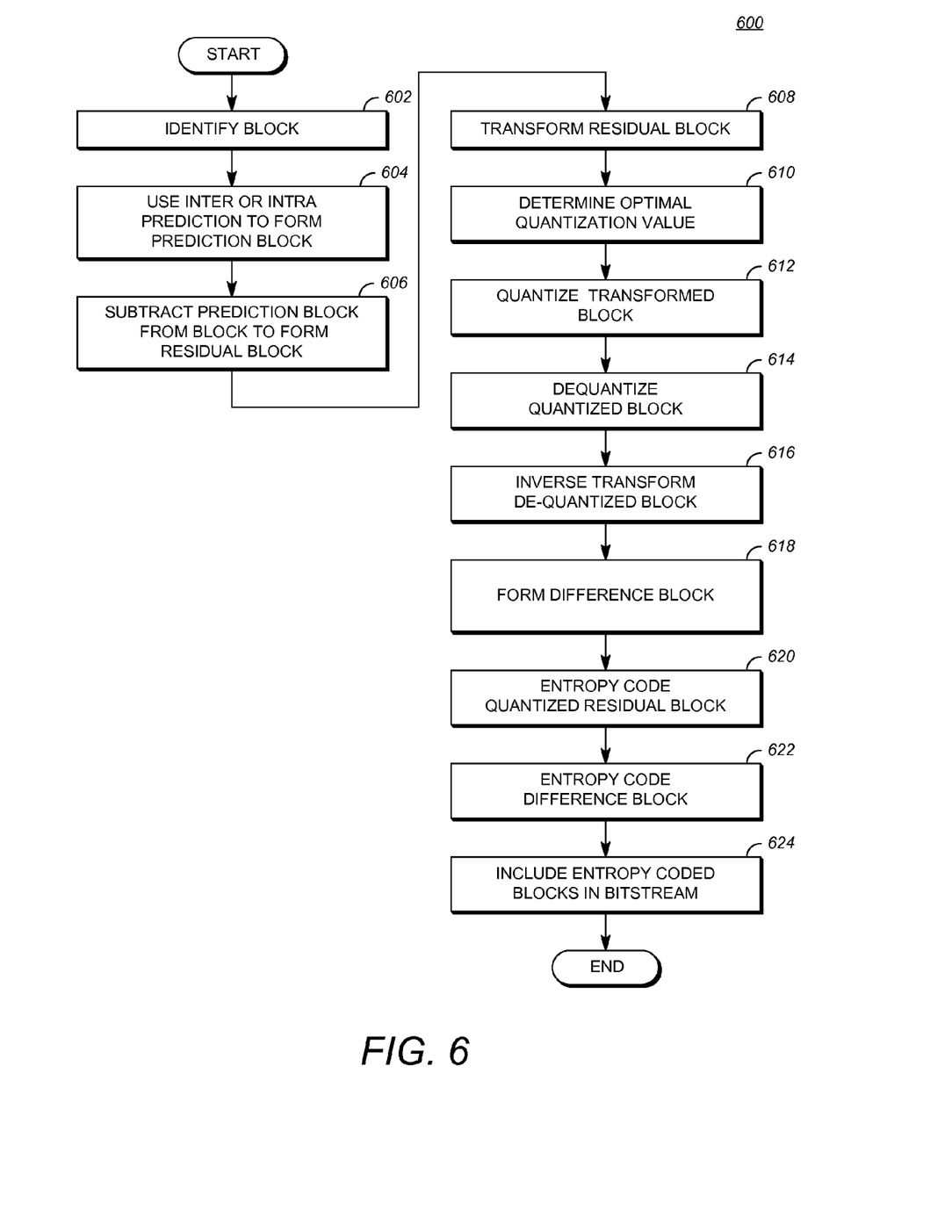
FIG. 6 is a flowchart of a process for lossless encoding of a video stream using inter or intra prediction according to an aspect of the teachings herein.

FIG. 6 is a flowchart of a process 600 for losslessly encoding a video stream using inter or intra prediction according to an aspect of the teachings herein. Process 600 can be implemented in an encoder such as encoder 470 to select lossless encoding using inter or intra prediction modes used by encoder 470 to encode a video stream, for example. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block from a frame of video data is identified for processing. Identify can mean select, choose, indicate, determine or otherwise identify in any manner whatsoever. As shown in FIG. 3, a video stream can include frames of video data that include macroblocks or blocks. Blocks can be processed in raster scan order starting with the block at the upper left hand corner and proceeding along successive rows until all of the blocks of the frame are processed. Other scan orders can be used with the teachings herein.

At step 604, the identified block can be processed using inter or intra prediction to form a prediction block. Different techniques can be used to evaluate available inter and intra prediction modes for the block and select the prediction mode that results in the least distortion, for example. One such strategy includes, for example, calculating test residuals for the various inter or intra prediction modes and comparing the results. The magnitude of the test residuals can be compared to select a prediction mode having the smallest residual values.

As mentioned above in relation to FIG. 4, inter prediction may use pixel data from a reference frame or frames to predict the pixel values of a current block. More specifically, pixel data closely matching the current block is translated according to one or more motion vectors to form a prediction block and is subtracted from the current block to form a residual block. Intra prediction uses pixel data from blocks in the current frame peripheral to the current block to form a prediction block that can be subtracted from the pixels in the current block to form the residual block. Accordingly, at step 606, the prediction block is subtracted from the block in a pixel-wise fashion to form the residual block.

At step 608, the residual block can be transformed using a transform to put the residual block data in a form amenable to further encoding. Examples of transforms that can be advantageously applied to video data are given in relation to FIG. 4, above. In an implementation, the residual error signals of a prediction unit (that is, the residual block) are further divided into transform unit that are smaller blocks for transformation and entropy coding. In this implementation, the best transform block size is selected using residual quadtree expansion.

At step 610, an optimal quantization value is determined for the transformed residual block. The quantization value or quantizer can determine the balance between the transformed residual block and the subsequently calculated difference block by distributing the information and hence the number of bits required to represent the original block between the residual block and the difference block. Due to the combination of transform domain and spatial domain encoding as described herein and applied to the residual block and the difference block, different distributions of data between the residual block and the difference block will result in different overall number of bits required to losslessly represent the block.

Figure 7:
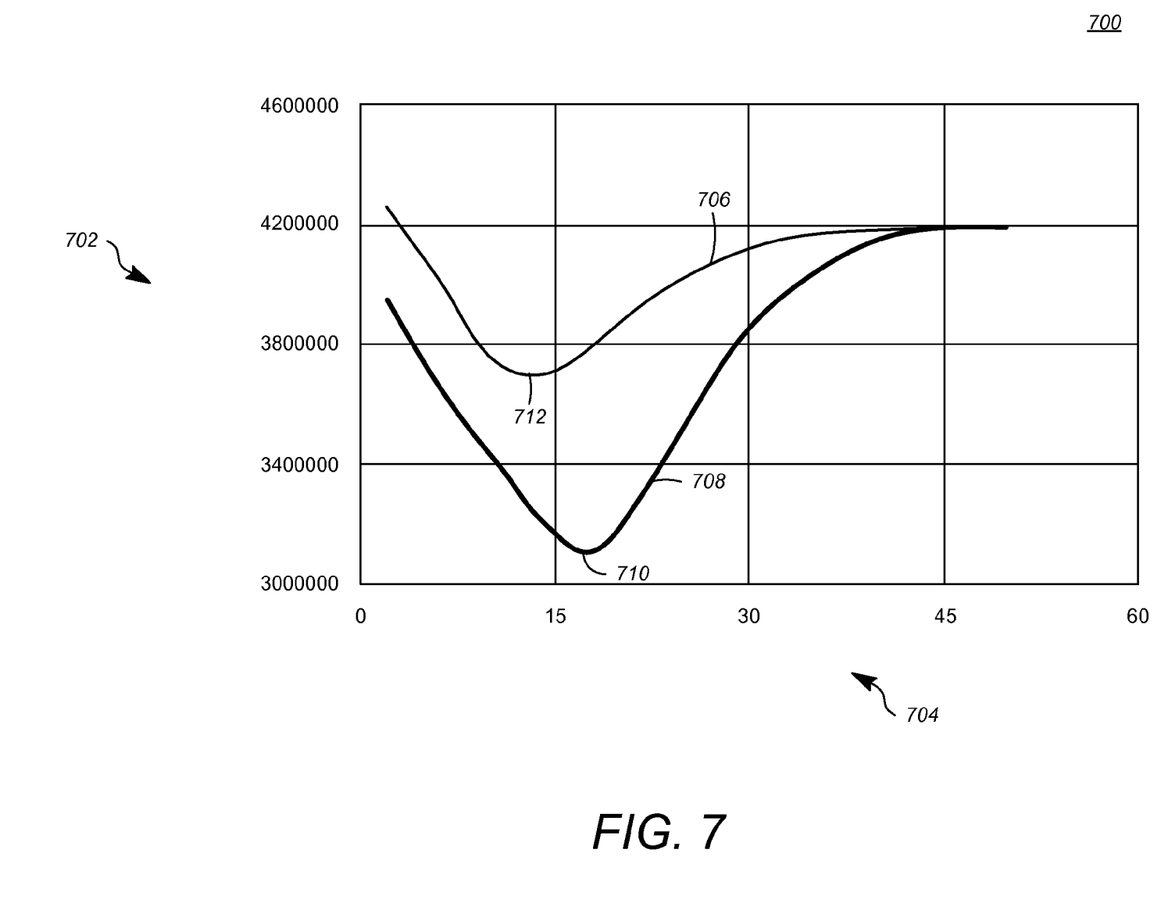
FIG. 7 is a graph showing the relationships between number of bits used to represent an exemplary video sequence and quantization values.

The effect of different quantization values is illustrated in FIG. 7. FIG. 7 is a graph 700 showing the relationship between total bits 702 used to represent an exemplary video sequence and quantization values 704. A first curve 706 compares the bits used to encode the video stream with various quantization values fixed at the frame level. In contrast, a second curve 708 compares the bits used to encode the video stream using variable quantization values at the block level. At a lowest point 710 of second curve 708 (average quantization value of 16, adaptive at the block level), the bit savings is around 28% as compared to lossless coding without the adaptive quantization as disclosed herein. At a lowest point 712 of first curve 706 (average quantization value of 14, adaptive at the frame level), the bit savings is about 15% as compared to lossless coding of the blocks without adaptive quantization at the frame level.

Returning to FIG. 6, the quantization value that results in the fewest bits to be output for the block can be determined in step 610, for example, by exhaustive search. All quantization values between a predetermined minimum and maximum value can be applied to the pixel data within the block and the results compared to determine the quantization value that results in the fewest bits to be output, for example. The next two paragraphs provide additional illustrative, non-limiting examples of determining an optimal quantization value.

Another technique for determining an optimal quantization value for a block of video data includes binary searching, where processing begins with an initial quantization value selected to be somewhere in the range of acceptable values. A value halfway to the minimum value and a value halfway to the maximum value from the initial value are then tested to determine which one yields the fewest number of bits. The quantization value resulting in the fewest bits is then selected as the next starting point and values less than and greater than the new point halfway to new limits are tested and the starting point is reset to the new value resulting in the fewest number of bits in the encoded bitstream. This technique can converge to the value having the minimum number of bits in a time related to $O(\log_2(n))$ rather than a time related to n, where n is the number of quantization values to be tested.

This processing can be made more efficient by first selecting a starting quantization value based on recently determined quantization values. The process may keep track of the quantization values that resulted in the minimum number of bits in the output stream for previous blocks of a frame and update the initial quantization value accordingly. The initial quantization value can be calculated as an average of previous quantization values with previous values weighted to dampen rapid changes due to possible extreme values. In addition, minimum and maximum limits on the values that the quantization value can assume may be set in order to limit the amount of computation. The minimum and maximum values can be set as relative to the initial quantization value, for example. In such an example, the quantization value can be prevented from reaching an optimal value due to the minimum and maximum limits. Optionally, the starting point is adjusted for subsequent blocks such that the technique will rapidly converge to an optimal value within a few blocks. In one example, the maximum and minimum quantization value can be limited to +/−7 from the initial quantization value.

Following determination of the optimal quantization value at step 610, the transformed block is quantized using the optimal quantization value at step 612. This quantized block is saved for further processing and a copy of the quantized block is de-quantized and inverse transformed. De-quantizing the quantized block at step 614 and inverse transforming the de-quantized block at step 616 results in a decoded block that would be equal to the original residual block except for errors introduced by the lossy encoding. This decoded block is subtracted from the original residual block at step 618 to yield a difference block with pixel values equal to the error signal introduced by the lossy encoding.

At step 620 the quantized residual block is entropy coded. Entropy coding comprises a class of lossless encoding schemes that reduces the number of bits in a data stream in a reversible fashion. At step 622, the difference block representing the error resulting from performing lossy encoding of the residual block is entropy coded. Following this, both entropy coded blocks are included in an encoded video bitstream at step 624. Also included in the encoded video bitstream is the optimal quantization value determined at step 610 to assist in decoding the block and bits to indicate that the video bitstream includes both an encoded residual block and an encoded difference block that can be used to make the decoding of the block lossless.

By entropy encoding the difference residual in step 622 and including the entropy coded difference residual in the output encoded video bitstream along with the encoded first residual, a decoder can perform lossless decoding of the block while saving bits in comparison lossless encoding accomplished by simply entropy encoding the original residual block. Bits can be set in a header in the output encoded video bitstream to inform the decoder that both a difference residual and an encoded residual are included in the bitstream for use in decoding the block along with the optimal quantization value. Placing limits on the amount that a quantization value can change from block to block permits the number of bits required to encode the quantization value to be limited. This allows the quantization value to be encoded as a change from a previously used value, thereby saving bits in the encoded video bitstream.

If the number of bits used to represent a block I after entropy coding is R(I), R(I) cannot be directly discerned from block I. R(I) is, however, related to two factors due to the properties of entropy coding. The first is the number of zeroes in the block (that is, the sparsity of block I). The second is the coefficient magnitudes of block I (also called its energy). If block I is coded solely in the spatial or transform domain, block I cannot be sparse and many of the coefficients may be large. If block I is separated into $I=I_1+I_2$, when each part either is sparse or has small coefficients, $R(I_1)$ and $R(I_2)$ may be small enough that $R(I_1)+R(I_2)<R(I)$. In this case, choosing an optimal quantization coefficient for the residual block, the small coefficients in the transform domain may be quantized to zero, leading to a sparse transform domain block $I_1$. The remaining spatial domain coefficients of the difference block have much less energy, so the coefficients are much smaller and lead to a desirable block $I_2$.

By dynamically changing the quantization values used to transform the residual blocks, the residual signal energy can be distributed between the first stage transform domain coding and the second stage spatial domain coding. As a result, a particular signal can be coded with different coding efficiency and yield better performance than a single stage. The optimization of the quantization value can be performed by way of an exhaustive list or a simplified optimization algorithm. This quantization controlled energy re-distribution may yield a much improved coding performance over not adjusting the quantization values, as much as 25% for intra-frame coding and 15% for inter-frame coding When a decoder receives the encoded bitstream, the encoded residual block can be entropy decoded to produce a set of quantized transform coefficients. The quantized transform coefficients can be de-quantized and then inverse transformed to produce a residual block with errors due to the lossy encoding. This de-quantization uses the optimized quantized values determined by the encoder. The encoded difference block can be entropy decoded and added to the decoded residual block to recreate an error-free residual block. The error-free residual block can then be inter or intra predicted to exactly recreate the original block of video data.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream including a plurality of frames, the method comprising:
    selecting a block of a plurality of blocks of the frame;
    identifying, using a processor, an optimal quantization value, comprising:
        performing a quantization optimization loop for a plurality of candidate quantization values using the block including:
            identifying a candidate quantization value;
            predicting the block to form a residual block;
            partially encoding the residual block to form a partially encoded residual block;
            quantizing the partially encoded residual block to form a quantized block using the candidate quantization value;
            partially decoding the quantized block to form a decoded residual block;
            subtracting the decoded residual block from the residual block to form a difference block; and
            summing the bits included in the quantized block and the difference block to form an estimated number of bits; and
        identifying the candidate quantization value that results in the smallest estimated number of bits as the optimal quantization value,
        wherein the optimal quantization value is a quantization value for the block that minimizes a number of bits required to encode a residual block of the block and a difference block of the block, the residual block being a difference between the block and a prediction block for the block, and the difference block being a block including errors resulting from encoding the residual block;
    encoding the block using the optimal quantization value to form an encoded residual block and an encoded difference block by:
        quantizing and subsequently entropy coding the residual block to form the encoded residual block; and entropy coding the difference block without quantizing the difference block to form the encoded difference block; and
including the encoded residual block, the encoded difference block and the optimal quantization value in an encoded video bitstream.

2. The method of claim 1, further comprising:
identifying an initial candidate quantization value for the quantization optimization loop by averaging optimal quantization values from previously encoded frames of the plurality of frames.

3. The method of claim 1, further comprising:
identifying an initial candidate quantization value for the quantization optimization loop by averaging optimal quantization values from previously encoded blocks of the frame.

4. The method of claim 1 wherein partially encoding the residual block further comprises:
forming a prediction block for the block using one of inter prediction or intra prediction;
generating the residual block by subtracting the prediction block from the block; and
transforming the residual block to form the partially encoded residual block.

5. The method of claim 1 wherein partially decoding the quantized block further comprises:
de-quantizing the quantized block to form a de-quantized block using the candidate quantization value; and
inverse transforming the de-quantized block to form the decoded residual block.

6. The method of claim 1 wherein the optimal quantization value is within a value of +/−n from an initial candidate quantization value of the quantization loop; and wherein n is a number between 0 and 7.

7. The method of claim 1, further comprising:
forming the prediction block for the block using one of inter prediction or intra prediction; and
generating the residual block by subtracting the prediction block from the block; wherein identifying the optimal quantization value comprises testing each of a plurality of candidate quantization values by transforming the residual block to form a partially encoded block using each of the plurality of candidate quantization values; and wherein the optimal quantization value is a one of the plurality of candidate quantization values forming a sparsest partially encoded block after transformation.

8. The method of claim 7 wherein the plurality of candidate quantization values comprises all available quantization values.

9. The method of claim 7 wherein the plurality of candidate quantization values comprises an initial candidate quantization value and at least one additional candidate quantization value dependent upon a result of transforming the residual block using the initial candidate quantization value.

10. An apparatus for encoding a video stream including a plurality of frames, the apparatus comprising:
a memory; and
a processor configured to execute instructions stored in the memory to:
select a block of a plurality of blocks of a frame;
identify an optimal quantization value wherein the identify the optimal quantization value comprises:
performing a quantization optimization loop for a plurality of candidate quantization values using the block including:
identifying a candidate quantization value;
predicting the block to form a residual block;
partially encoding the residual block to form a partially encoded residual block;
quantizing the partially encoded residual block to form a quantized block using the candidate quantization value;
partially decoding the quantized block to form a decoded residual block;
subtracting the decoded residual block from the residual block to form a difference block; and
summing the bits included in the quantized block and the difference block to form an estimated number of bits; and
identifying the candidate quantization value that results in the smallest estimated number of bits as the optimal quantization value,
wherein the optimal quantization value is a quantization value for the block that minimizes a number of bits required to encode a residual block of the block and a difference block of the block, the residual block being a difference between the block and a prediction block for the block, and the difference block being a block including errors resulting from encoding the residual block;
encode the block using the optimal quantization value to form an encoded residual block and an encoded difference block by:
quantizing and subsequently entropy coding the residual block to form the encoded residual block; and
entropy coding the difference block without quantizing the difference block to form the encoded difference block; and
include the encoded residual block, the encoded difference block and the optimal quantization value in an encoded video bitstream.

11. The apparatus of claim 10 wherein the processor is configured to:
form the prediction block for the block using one of inter prediction or intra prediction;
generate the residual block by subtracting the prediction block from the block; and
identify the optimal quantization value by:
testing each of a plurality of candidate quantization values by transforming the residual block to form a partially encoded block using each of the plurality of candidate quantization values; wherein the optimal quantization value is a one of the plurality of candidate quantization values forming a sparsest partially encoded block after transformation.

12. The apparatus of claim 11 wherein the plurality of candidate quantization values comprises an initial candidate quantization value and at least one additional candidate quantization value dependent upon a result of transforming the residual block using the initial candidate quantization value.

13. The apparatus of claim 12 wherein the initial candidate quantization value comprises an average of optimal quantization values from previously encoded frames of the plurality of frames.

14. The apparatus of claim 12 wherein the initial candidate quantization value comprises an average of optimal quantization values from previously encoded blocks of the frame.

15. The apparatus of claim 12 wherein the optimal quantization value is within a value of +/−n from the initial candidate quantization value, wherein n is an integer between 0 and 7, inclusive.

16. The apparatus of claim 11 wherein the plurality of candidate quantization values comprises an initial candidate quantization value and additional candidate quantization values between a minimum value and a maximum value; and wherein the processor is configured to identify the optimal quantization value using a binary search beginning with the initial candidate quantization value.

17. The apparatus of claim 11 wherein the plurality of candidate quantization values comprises an initial candidate quantization value, the initial candidate quantization value being one of:
an average of optimal quantization values from previously encoded frames of the plurality of frames; or
an average of optimal quantization values from previously encoded blocks of the frame.

18. A method for decoding an encoded video bitstream including a plurality of frames, the method comprising:
identifying, using a processor, an entropy coded quantized block and an entropy coded difference block associated with a block of a frame by reading bits in a block header associated with the block;
identifying an optimal quantization value for the quantized block by reading bits in a block header associated with the block, wherein the optimal quantization value was selected by an encoder performing a quantization optimization loop for a plurality of candidate quantization values using the block including:
identifying a candidate quantization value;
predicting the block to form a residual block;
partially encoding the residual block to form a partially encoded residual block;
quantizing the partially encoded residual block to form a candidate quantized block using the candidate quantization value;
partially decoding the candidate quantized block to form a decoded residual block;
subtracting the decoded residual block from the residual block to form a candidate difference block; and
summing the bits included in the candidate quantized block and the candidate difference block to form an estimated number of bits; and
identifying the candidate quantization value that results in the smallest estimated number of bits as the optimal quantization value for the block;
entropy decoding the entropy coded quantized block to form a quantized block;
entropy decoding the entropy coded difference block to form a difference block;
de-quantizing the quantized block using the optimal quantization value to form a transformed block;
inverse transforming the transformed block to form a first residual block;
adding the difference block to the first residual block to form a second residual block;
predicting the block to form a prediction block; and
adding the second residual block to the predicted block to form a decoded block.

* * * * *